US012449207B2

(12) United States Patent
Gerstler et al.

(10) Patent No.: US 12,449,207 B2
(45) Date of Patent: Oct. 21, 2025

(54) MULTIFURCATING HEAT EXCHANGER WITH INDEPENDENT BAFFLES

(71) Applicant: General Electric Company, Schenectady, NY (US)

(72) Inventors: William Dwight Gerstler, Niskayuna, NY (US); Daniel Jason Erno, Clifton Park, NY (US); Elizabeth Diane Turner, Hamilton, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/534,941

(22) Filed: Dec. 11, 2023

(65) Prior Publication Data

US 2024/0125556 A1    Apr. 18, 2024

Related U.S. Application Data

(63) Continuation of application No. 16/827,312, filed on Mar. 23, 2020, now abandoned.

(51) Int. Cl.
*F28D 7/16*      (2006.01)
*F28F 7/02*      (2006.01)
*F28F 9/22*      (2006.01)

(52) U.S. Cl.
CPC .............. *F28D 7/1661* (2013.01); *F28F 7/02* (2013.01); *F28F 9/22* (2013.01); *F28F 2009/222* (2013.01)

(58) Field of Classification Search
CPC .......... F28F 7/02; F28F 7/1607; F28F 7/1661; F28F 2009/222; F28D 9/22; F28D 7/1607; F28D 7/1661
See application file for complete search history.

(56) References Cited

U.S. PATENT DOCUMENTS 2,411,097 A * 11/1946 Kopp ............... F28F 9/22
                                                165/161
4,142,578 A *  3/1979 Smith .............. F28F 9/22
                                                165/161

(Continued)

FOREIGN PATENT DOCUMENTS

CN    101427093 A    5/2009
CN    103339458 B2   8/2016

(Continued)

OTHER PUBLICATIONS

Arie et al.,"Air-Side Heat Transfer Enhancement Utilizing Design Optimization and an Additive Manufacturing Technique",Contributed by the Heat Transfer Division of ASME for publication in the Journal of Heat Transfer, vol. No. 139, Issue No. 3, p. 12, Dec. 28, 2016.

(Continued)

*Primary Examiner* — Jianying C Atkisson
*Assistant Examiner* — For K Ling
(74) *Attorney, Agent, or Firm* — McGarry Bair PC

(57) ABSTRACT

A heat exchanger includes a core defining a first passageway for a first fluid flow and a second passageway for a second fluid flow. The core includes an assembly of a plurality of unit cells coupled together. Each unit cell defines a first passageway portion within an interior volume and a second passageway portion at an exterior surface. Each unit cell includes a plurality of first openings into the interior volume and forms the second passageway in volumes between the plurality of unit cells. The assembly is shaped to combine and divide the first fluid in the first passageway portion and combine and divide the second fluid in the second passageway portion during exchange of heat between the first fluid and the second fluid. Each second passageway portion receives the second fluid from three other second passageway portions. The heat exchanger further includes at least (Continued)

one baffle in at least one of the first passageway or the second passageway to route the first fluid flow independently from the second fluid flow.

20 Claims, 12 Drawing Sheets

(56) References Cited

U.S. PATENT DOCUMENTS

| | | | |
|---|---|---|---|
| 4,533,584 A * | 8/1985 | Takeuchi | B01D 46/2492 428/116 |
| 5,725,051 A * | 3/1998 | Veltkamp | F28F 9/02 165/165 |
| 6,412,975 B1 * | 7/2002 | Schuchardt | B01F 25/43161 366/337 |
| 7,285,153 B2 * | 10/2007 | Bruun | F23C 13/00 165/DIG. 395 |
| 8,573,289 B1 * | 11/2013 | Roper | F28D 7/0066 165/173 |
| 9,222,733 B2 * | 12/2015 | Pazzaglia | B01J 12/00 |
| 9,909,448 B2 | 3/2018 | Gerstler et al. | |
| D818,093 S | 5/2018 | Erno et al. | |
| 10,041,375 B2 | 8/2018 | Gerstler et al. | |
| 10,107,555 B1 | 10/2018 | Miller et al. | |
| 10,184,728 B2 | 1/2019 | Sabo et al. | |
| 10,209,009 B2 | 2/2019 | Gerstler et al. | |
| 10,247,296 B2 | 4/2019 | Van Der Merwe et al. | |
| 10,365,047 B2 | 7/2019 | Lassini et al. | |
| 10,369,540 B2 * | 8/2019 | Lo | B01J 19/0013 |
| 10,371,452 B2 | 8/2019 | Veilleux, Jr. et al. | |
| 10,422,585 B2 * | 9/2019 | Jensen | F28D 7/1615 |
| 10,493,693 B1 * | 12/2019 | Robinson | B33Y 80/00 |
| 2005/0221150 A1 * | 10/2005 | Revol | H01M 8/0247 428/596 |
| 2013/0206374 A1 | 8/2013 | Roisin et al. | |
| 2015/0014323 A1 * | 1/2015 | Loukus | B32B 3/266 428/34.1 |
| 2016/0076384 A1 | 3/2016 | Snyder et al. | |
| 2016/0109183 A1 * | 4/2016 | Yang | F28F 7/02 165/157 |
| 2016/0202003 A1 * | 7/2016 | Gerstler | F28D 9/00 |
| 2016/0281532 A1 | 9/2016 | Rambo et al. | |
| 2017/0030519 A1 * | 2/2017 | Kuczek | F28F 3/086 |
| 2017/0248372 A1 | 8/2017 | Erno et al. | |
| 2017/0367218 A1 * | 12/2017 | Gerstler | F28D 9/0093 |
| 2018/0187984 A1 | 7/2018 | Manzo | |
| 2018/0297843 A1 * | 10/2018 | Lo | B01J 19/243 |
| 2018/0299066 A1 | 10/2018 | Erno et al. | |
| 2018/0331016 A1 * | 11/2018 | Kang | F28D 20/021 |
| 2019/0003315 A1 | 1/2019 | Erno et al. | |
| 2019/0178585 A1 | 6/2019 | De Bock et al. | |
| 2019/0186361 A1 | 6/2019 | Gerstler et al. | |
| 2020/0016704 A1 | 1/2020 | Stewart, Jr. et al. | |
| 2020/0018560 A1 * | 1/2020 | Sabo | F28F 7/02 |
| 2020/0033070 A1 * | 1/2020 | Vlahinos | B01F 25/43231 |

FOREIGN PATENT DOCUMENTS

| | | |
|---|---|---|
| EP | 3249336 A2 | 11/2017 |
| JP | 2017072957 A | 4/2017 |
| JP | 2017538086 A | 12/2017 |
| WO | 2016057443 A1 | 4/2016 |

OTHER PUBLICATIONS

Gerstler et al., "Introduction of an Additively Manufactured Multi-Furcating Heat Exchanger", 16th IEEE Intersociety Conference on Thermal and Thermomechanical Phenomena in Electronic Systems (ITherm), pp. 624-633, Orlando, FL, USA, Jul. 7, 2017.

Keramati et al.,"Additive Manufacturing of Compact Manifold-Microchannel Heat Exchangers Utilizing Direct Metal Laser Sintering", 18th IEEE Intersociety Conference on Thermal and Thermomechanical Phenomena in Electronic Systems (ITherm), pp. 423-429, Las Vegas, NV, USA, Jul. 11, 2019.

* cited by examiner

MULTIFURCATING HEAT EXCHANGER WITH INDEPENDENT BAFFLES

CROSS REFERENCE TO RELATED APPLICATIONS

This application claims priority to U.S. patent application Ser. No. 16/827,312, filed Mar. 23, 2020, now abandoned, which is incorporated herein by reference in its entirety.

BACKGROUND

The present disclosure relates generally to heat exchangers and, more specifically, heat exchangers including unit cells forming furcating flow passageways and a baffle design that allows for independent baffling of each fluid domain.

Some heat exchangers utilize heat transfer fluids that flow through the heat exchangers and transfer heat. A heat transfer efficiency of the heat exchangers is determined, at least in part, by the flow of the heat transfer fluids through the heat exchangers. As the heat transfer fluids flow through the heat exchangers, the heat transfer fluids tend to establish a boundary layer which increases thermal resistance and reduces the heat transfer efficiency of the heat exchangers. The heat transfer efficiency of the heat exchangers is also affected by characteristics of the heat exchanger such as material properties, surface areas, flow configurations, pressure drops, and resistivity to thermal exchange. Improving any of these characteristics allows the heat exchanger to have an increased heat transfer efficiency.

Some systems or applications require heat exchangers to fit within a specified system volume and weigh less than a specified weight. Reducing the size of the heat exchangers to meet system requirements affects the characteristics that determine heat transfer efficiency. Some heat exchangers are not properly shaped to fit within the systems, which results in ineffective use of space and/or wasted volume. Some heat exchangers are formed to meet system requirements using fabrication techniques that require multiple joints, such as brazed and welded joints. Such joints may deteriorate over time, thereby decreasing a service life of the heat exchangers.

BRIEF DESCRIPTION

According to one example, a heat exchanger comprises a core. The core defines a first passageway configured for a first fluid to flow through and a second passageway configured for a second fluid to flow through. The core comprises an assembly comprised of a plurality of unit cells coupled together. Each unit cell of the assembly defines a first passageway portion within an interior volume of each unit cell and a second passageway portion at an exterior surface of each unit cell. Each unit cell includes a plurality of first openings into the interior volume for flow of the first fluid through the first passageway portion. The assembly forms the second passageway in volumes between the plurality of unit cells coupled together. The assembly is shaped to combine and divide the first fluid in the first passageway portion in each unit cell and to combine and divide the second fluid in the second passageway portion of each unit cell during exchange of heat between the first fluid and the second fluid. Each second passageway portion receives the second fluid from three other second passageway portions. The heat exchanger further comprises at least one baffle in at least one of the first passageway or the second passageway configured to route the flow of first fluid independently from the flow of second fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
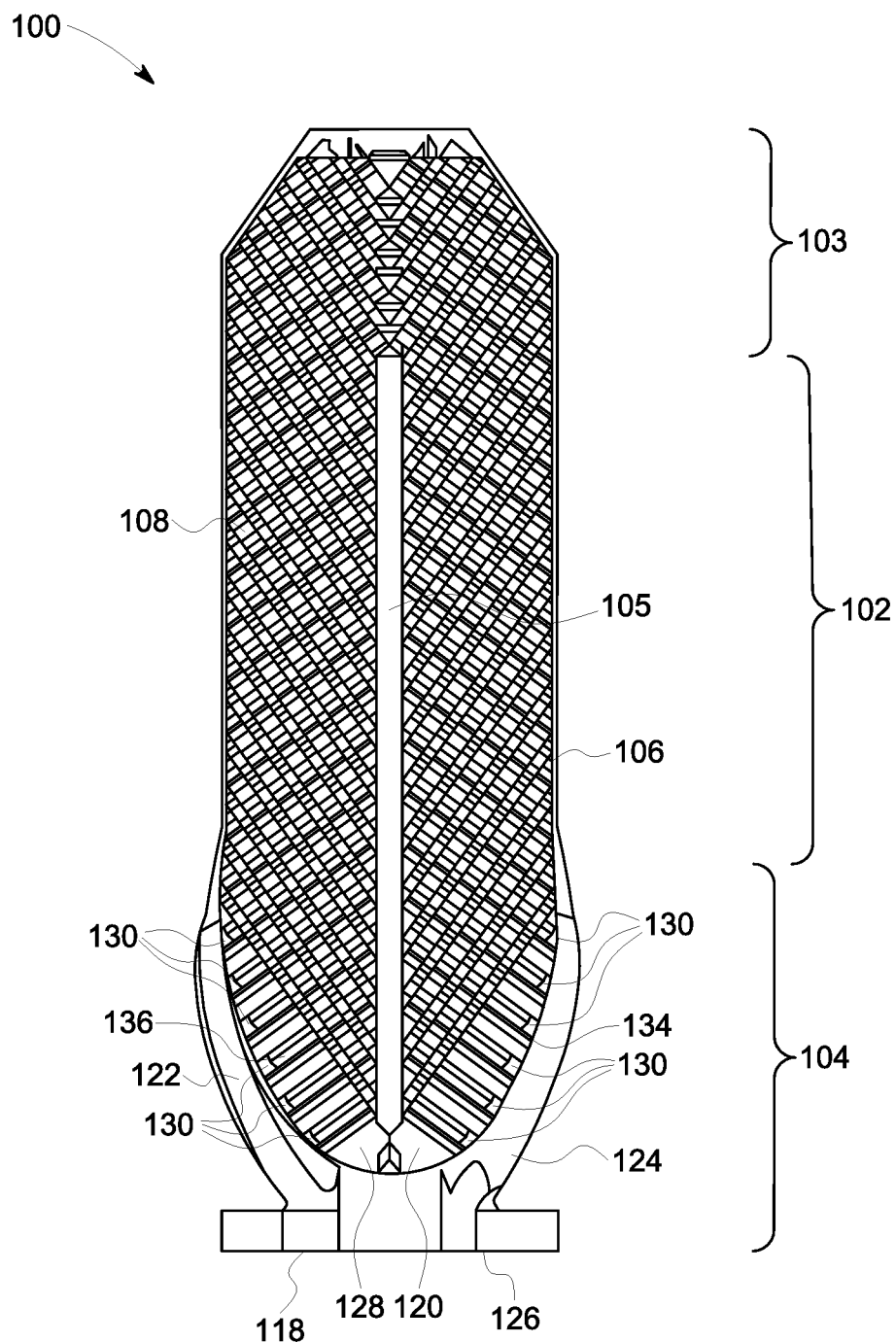
FIG. 1 is a schematic sectional view of an exemplary heat exchanger.
Figure 5:
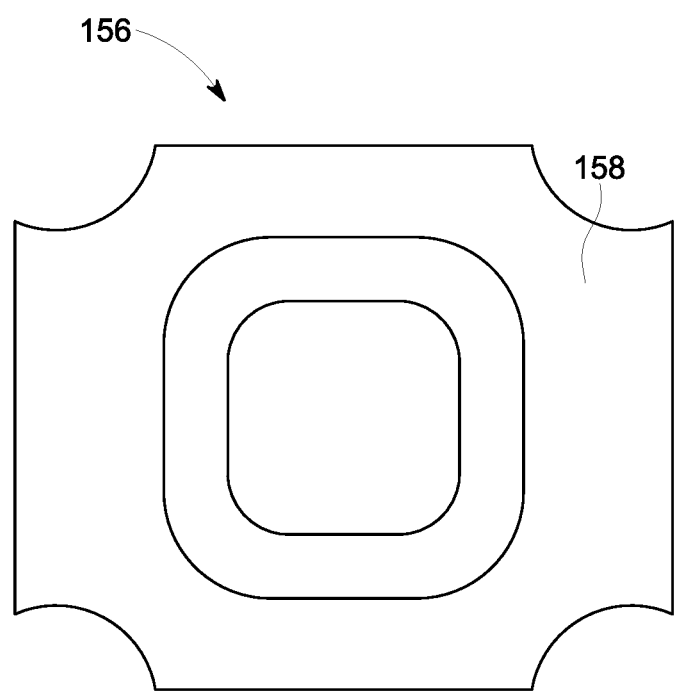
FIG. 5 is a schematic side view of an exemplary unit cell for use in the heat exchanger shown in FIG. 1
Figure 6:
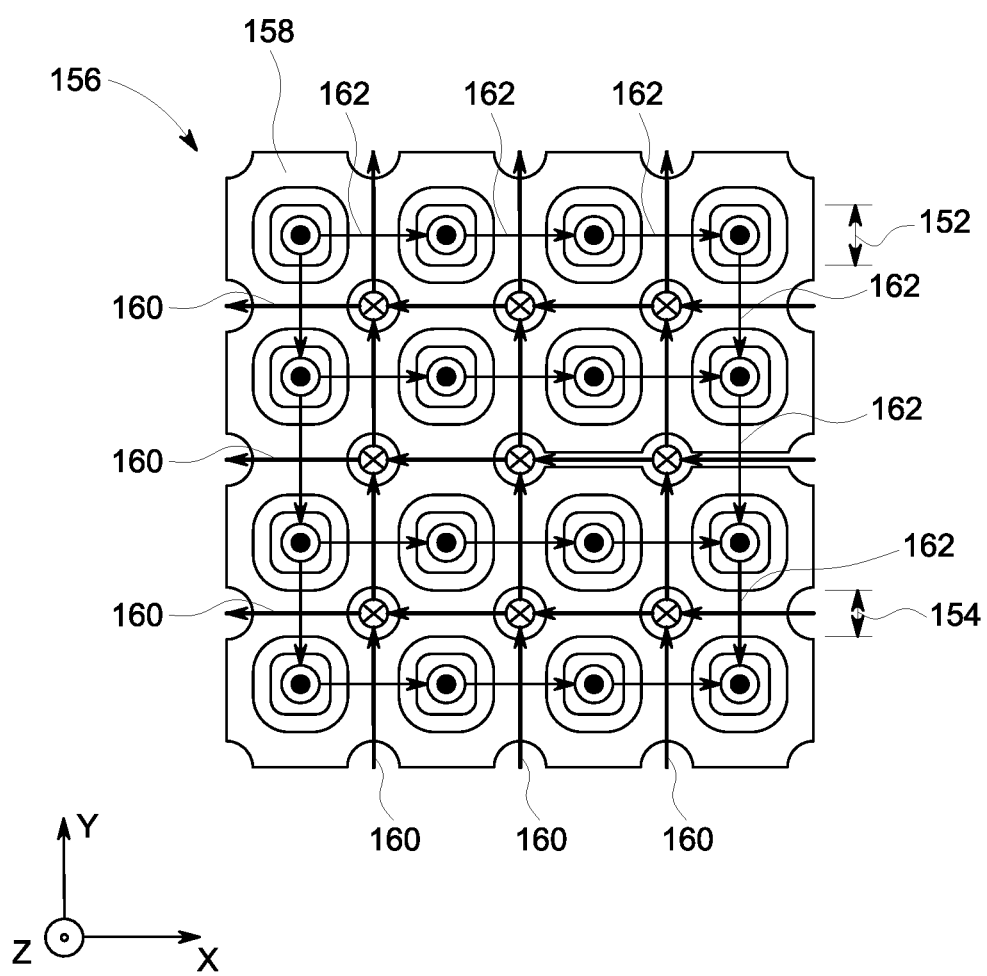
FIG. 6 is a schematic view of fluid flow through a plurality of the unit cells shown in FIG. 5.
Figure 7:
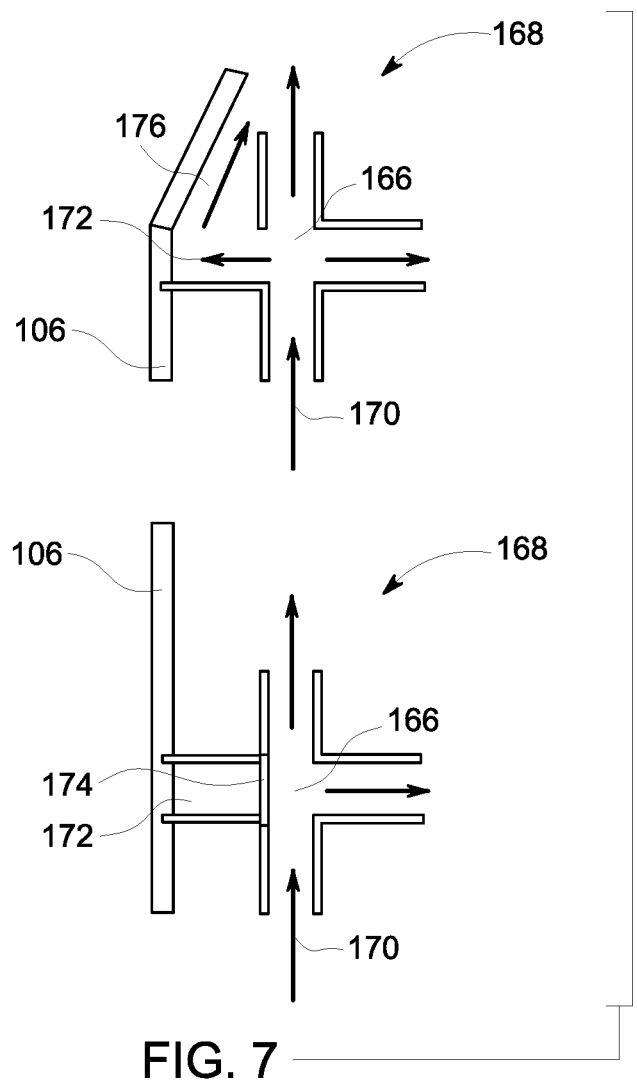
FIG. 7 is a schematic view of a plurality of exemplary flow passages adjacent a casing of the heat exchanger shown in FIG. 1.
Figure 8:
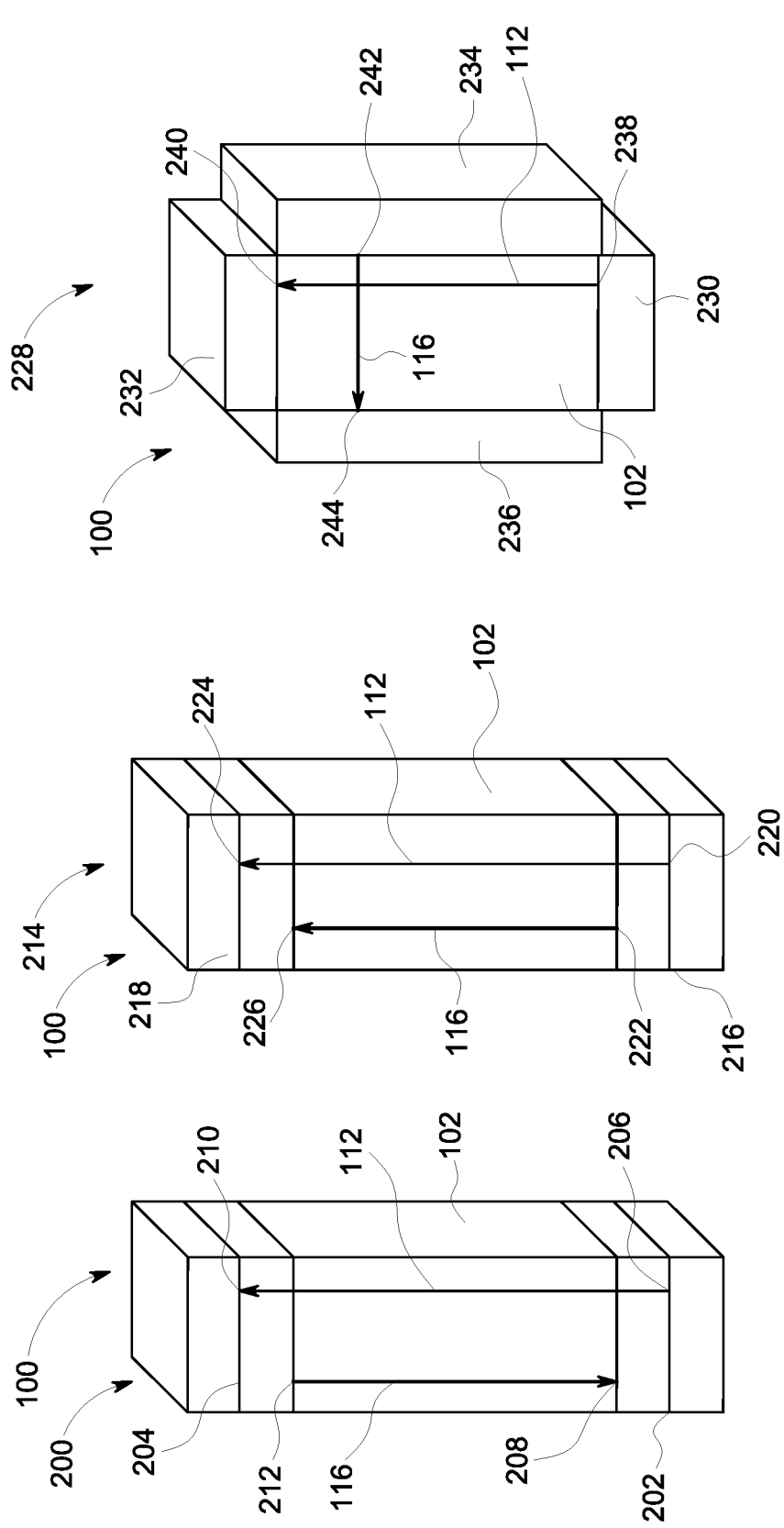
FIG. 8 is a schematic view of a plurality of exemplary flow configurations of the heat exchanger shown in FIG. 1.
Figure 9:
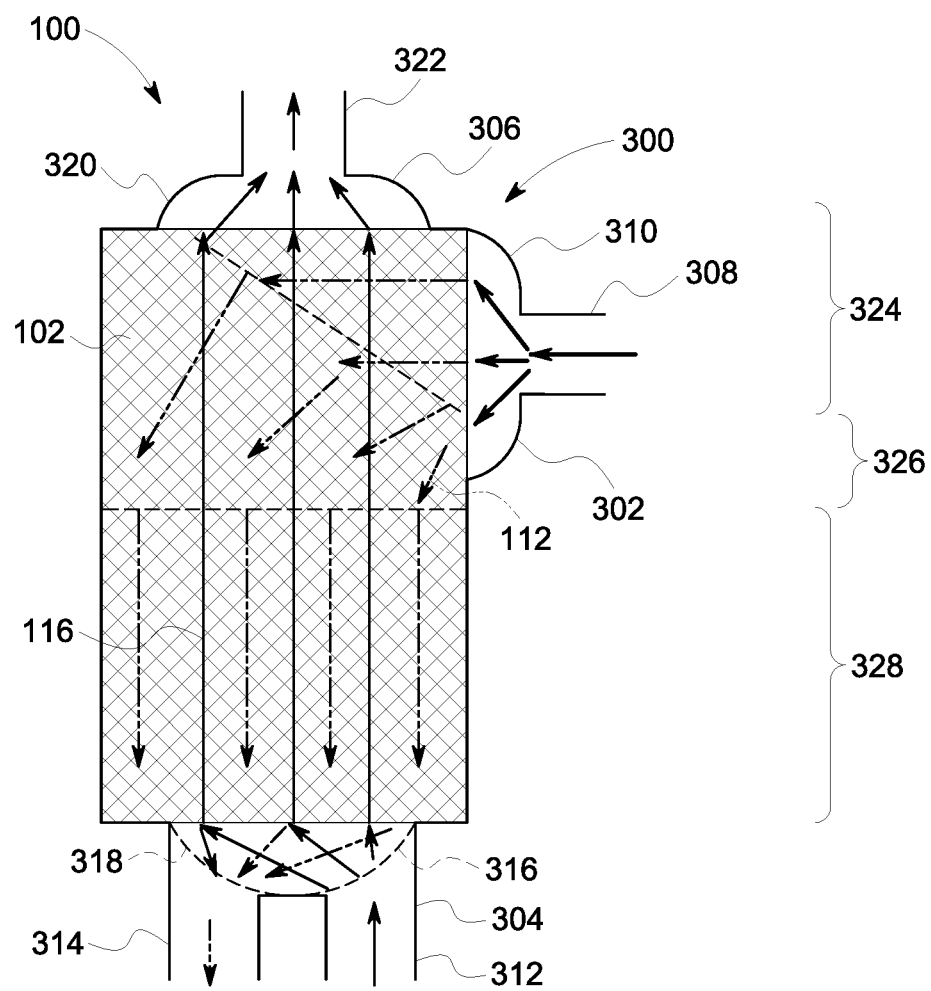
FIG. 9 is a schematic view of a hybrid counter-flow configuration of the heat exchanger shown in FIG. 1.
Figure 10:
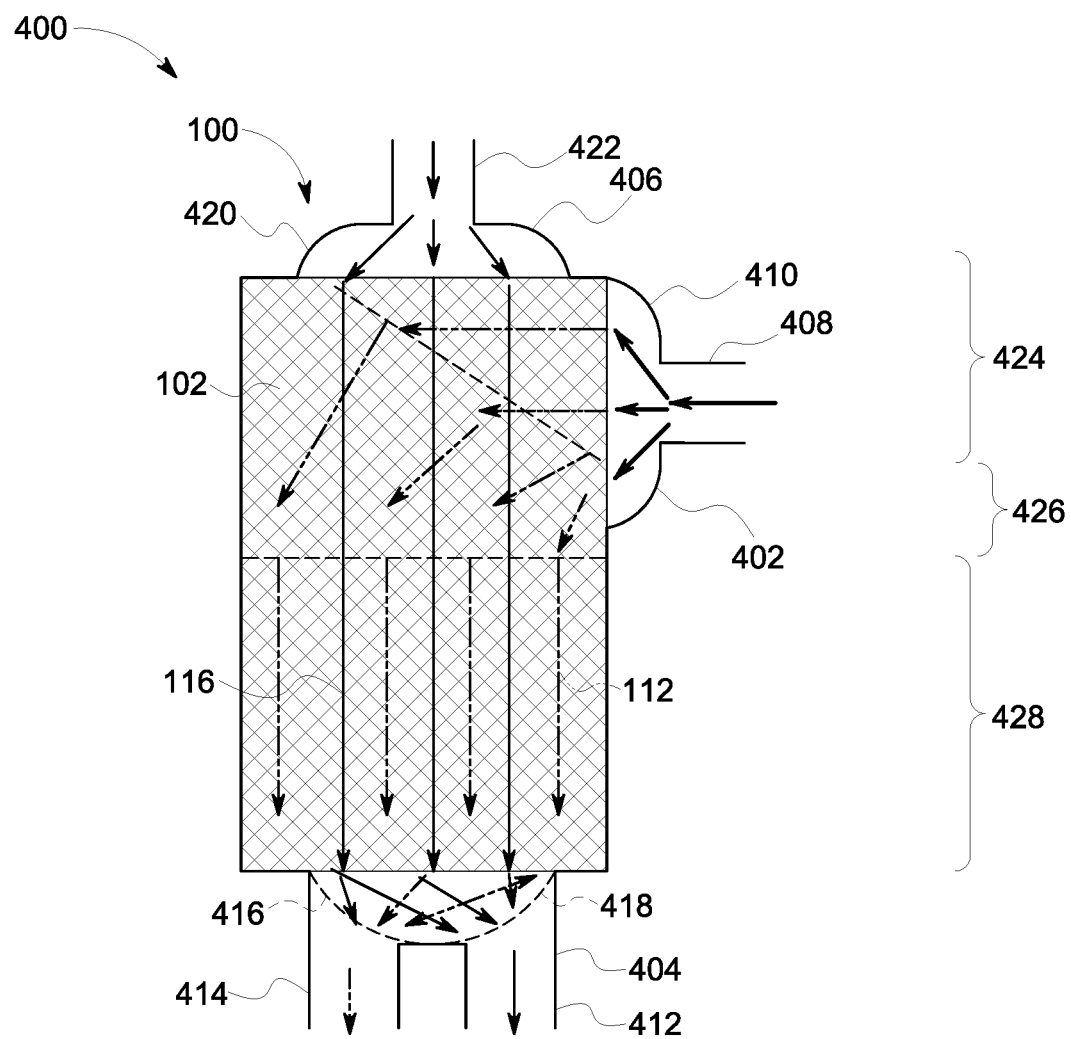
FIG. 10 is a schematic view of a hybrid parallel flow configuration of the heat exchanger shown in FIG. 1.
Figure 11:
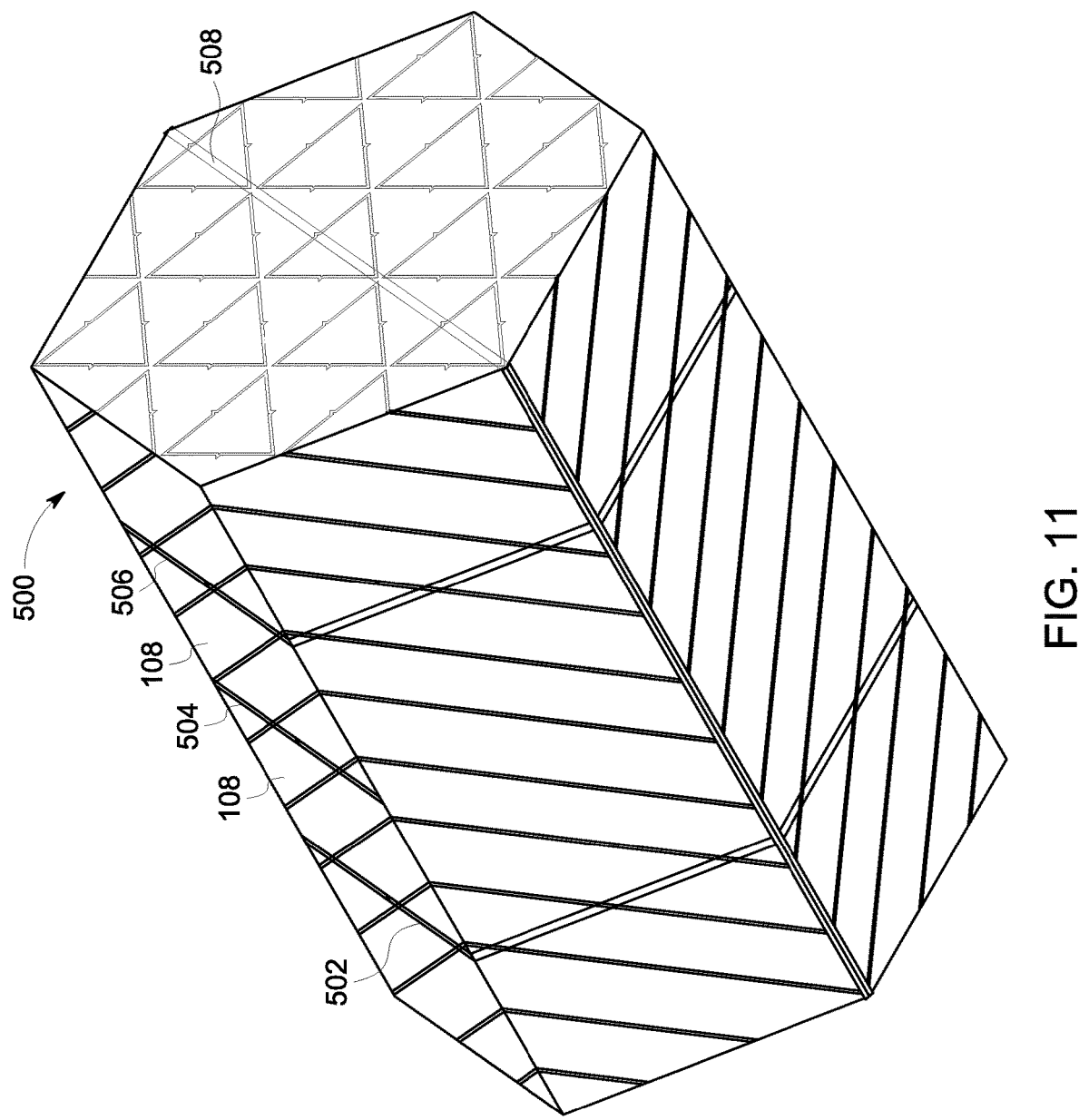
FIG. 11 is a schematic perspective view of an exemplary heat exchanger core.
Figure 12:
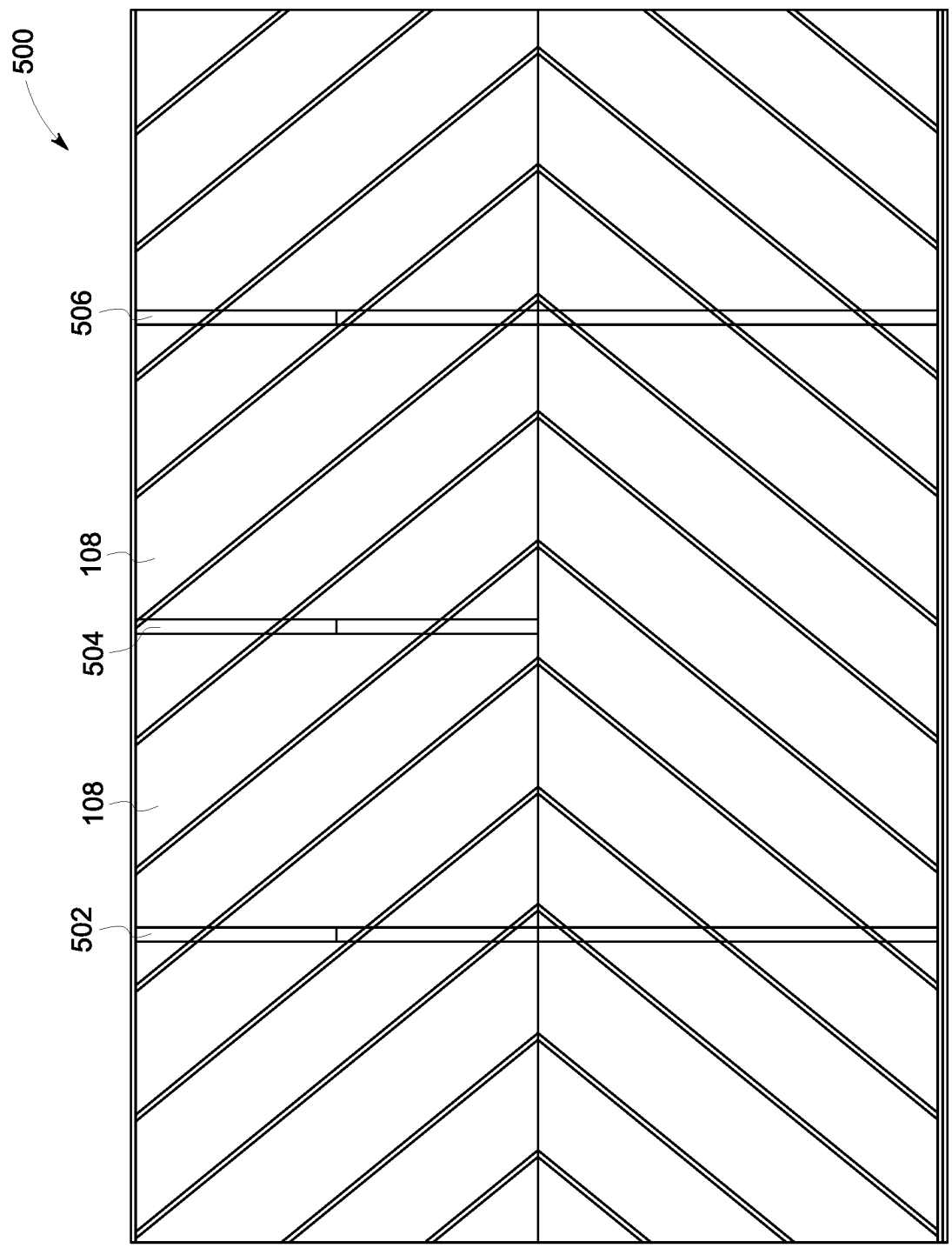
FIG. 12 is a schematic side view of the exemplary heat exchanger core of FIG. 11.
Figure 13:
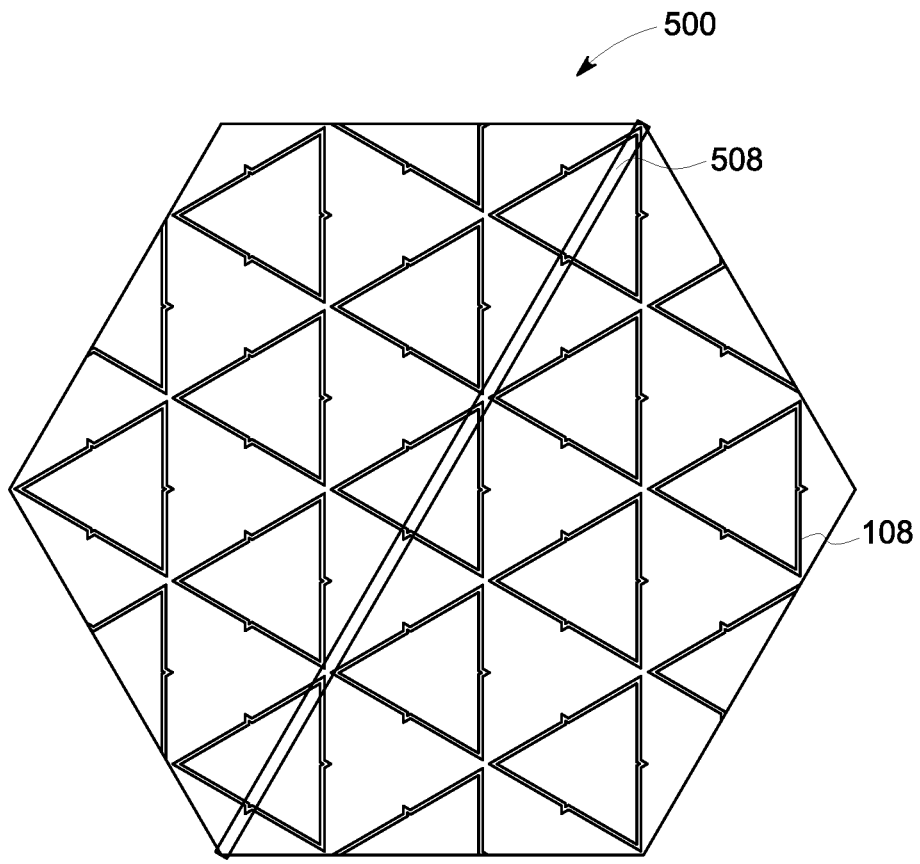
FIG. 13 is a schematic end view of the exemplary heat exchanger core of FIG. 11.
Figure 14:
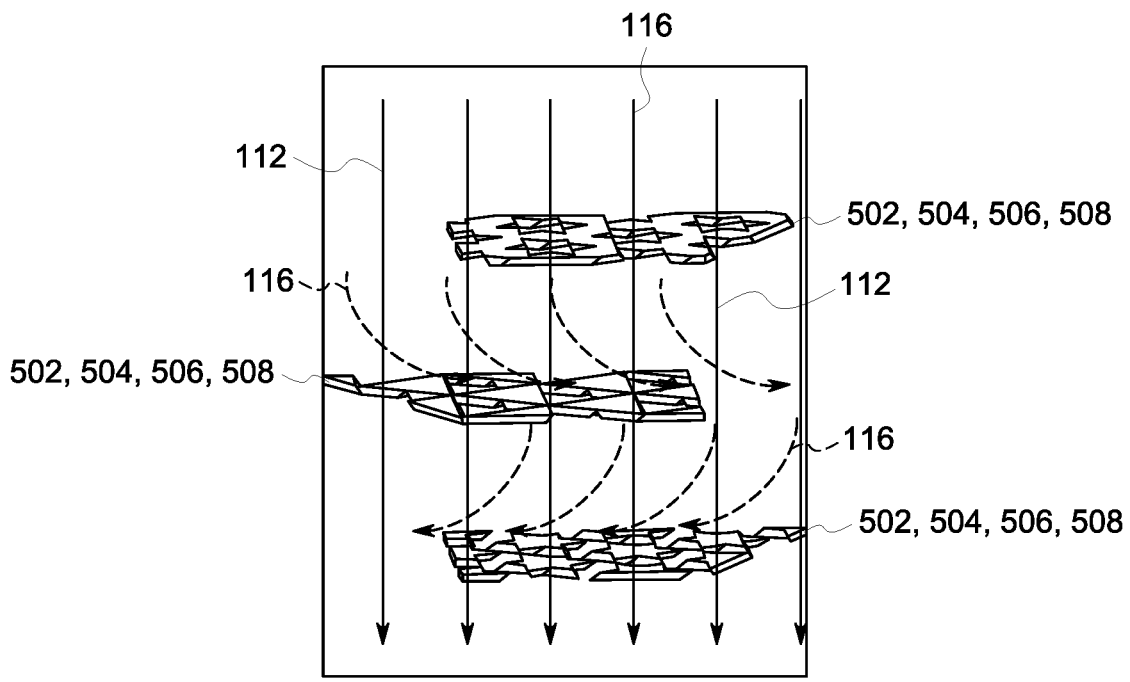
FIG. 14 is a schematic view of the and the first and second flow domains.

FIG. 6 is a schematic view of fluid flow through a plurality of the unit cells shown in FIG. 5;

FIG. 7 is a schematic view of a plurality of exemplary flow passages adjacent a casing of the heat exchanger shown in FIG. 1;

FIG. 8 is a schematic view of a plurality of exemplary flow configurations of the heat exchanger shown in FIG. 1;

FIG. 9 is a schematic view of a hybrid counter-flow configuration of the heat exchanger shown in FIG. 1;

FIG. 10 is a schematic view of a hybrid parallel flow configuration of the heat exchanger shown in FIG. 1;

FIG. 11 is a schematic perspective view of an exemplary heat exchanger core;

FIG. 12 is a schematic side view of the exemplary heat exchanger core of FIG. 11;

FIG. 13 is a schematic end view of the exemplary heat exchanger core of FIG. 11; and FIG. 14 is a schematic view of the and the first and second flow domains.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about,"

"substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to a centerline of the heat exchanger. Moreover, the terms "radial" and "radially" refer to directions and orientations that extend substantially perpendicular to the centerline of the heat exchanger. In addition, as used herein, the terms "circumferential" and "circumferentially" refer to directions and orientations that extend arcuately about the centerline of the heat exchanger. It should also be appreciated that the term "fluid" as used herein includes any medium or material that flows, including, but not limited to, air, gas, liquid, and steam.

The systems and methods described herein include a core that enables heat exchangers to have different shapes, sizes, and flow configurations. The core includes a plurality of unit cells. The unit cells define passageways for at least two different heat exchange fluids such that the fluids combine and divide in close proximity separated only by a sidewall of the unit cell. In some embodiments, each unit cell is configured to receive flows of heat exchange fluid from at least three other unit cells such that the flows combine into a single flow. In addition, each unit cell forms a trifurcated passageway portion such that the flow divides and is discharged into at least three other unit cells. As a result, the thermal boundary layers of the heat exchange fluids are reduced and the heat exchange fluids more efficiently transfer heat through the sidewalls of the unit cells in comparison to heat exchange fluids in known heat exchangers. Moreover, the heat exchangers described herein include multiple arrangements and flow configurations to meet overall system requirements and have increased efficiency.

Figure 2:
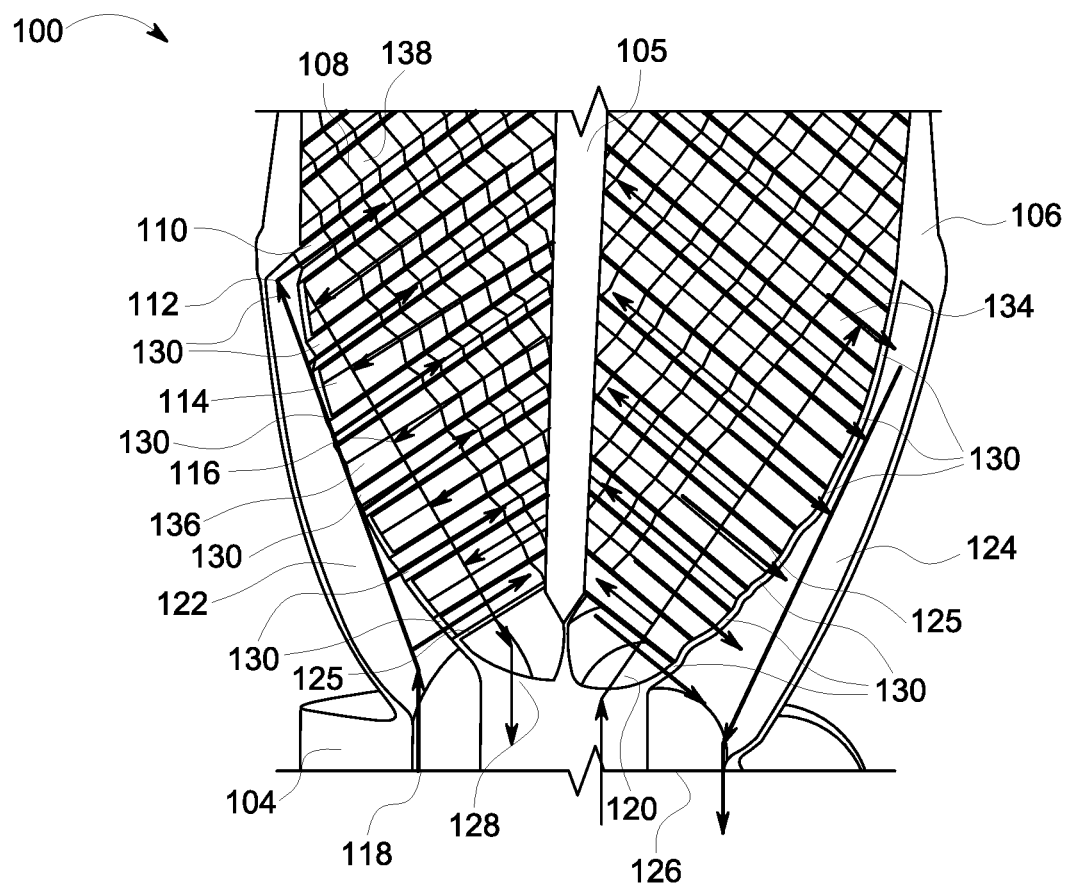
FIG. 2 is a schematic view of a portion of the heat exchanger shown in FIG. 1.

FIG. 1 is a sectional view of an exemplary heat exchanger 100. FIG. 2 is a partially schematic view of a portion of heat exchanger 100. Heat exchanger 100 includes a core 102, a redirection portion 103, a manifold portion 104, and a casing 106. Each of manifold portion 104, core 102, and redirection portion 103 includes a plurality of unit cells 108 defining a first passageway 110 for a first fluid 112 to flow through and a second passageway 114 for a second fluid 116 to flow through. In redirection portion 103, first fluid 112 and second fluid 116 are redirected by unit cells 108. Specifically, first fluid 112 and second fluid 116 are turned approximately 180.degree. in redirection portion 103. In alternative embodiments, heat exchanger 100 has any configuration that enables heat exchanger 100 to operate as described herein. For example, in some embodiments, at least a portion of first fluid 112 and/or second fluid 116 is replaced with an at least partially solid substance configured to accommodate thermal shocks, such as wax, fusible alloy and/or molten salt.

In the exemplary embodiment, manifold portion 104 includes a first inlet 118, a second inlet 120, an inlet header 122, an outlet header 124, a first outlet 126, and a second outlet 128. In alternative embodiments, manifold portion 104 has any configuration that enables heat exchanger 100 to operate as described herein. For example, in some embodiments, manifold portion 104 includes a plurality of first inlets 118, second inlets 120, inlet headers 122, outlet headers 124, first outlets 126, and/or second outlets 128. In further embodiments, heat exchanger 100 includes a plurality of manifold portions 104 coupled to core 102.

In the exemplary embodiment, each of inlet header 122 and outlet header 124 include a plurality of ports 130 in fluid communication with first passageway 110. Inlet header 122 and outlet header 124 change in cross-sectional area along the direction of flow of first fluid 112 to accommodate the differing volume of first fluid 112 in inlet header 122 and outlet header 124 due to first fluid 112 flowing through ports 130. Specifically, inlet header 122 tapers in cross-sectional area from a maximum cross-sectional area adjacent first inlet 118 to a minimum cross-sectional area adjacent a distal end of inlet header 122. Outlet header 124 increases in cross-sectional area from a minimum cross-sectional area adjacent a distal end of outlet header 124 to a maximum cross-sectional area adjacent first outlet 126. Ports 130 are substantially bell-shaped to facilitate smooth fluid flow through ports 130 and to minimize irreversible flow losses. In alternative embodiments, heat exchanger 100 includes any inlet header 122 and outlet header 124 that enables heat exchanger 100 to operate as described herein. For example, in some embodiments, heat exchanger 100 includes a plurality of inlet headers 122 and outlet headers 124. In further embodiments, at least one inlet header 122 and/or outlet header 124 is coupled to second passageway 114.

In the exemplary embodiment, core 102 further includes an inlet plenum 134 and an outlet plenum 136. Inlet plenum 134 and outlet plenum 136 are in fluid communication with second passageway 114. Inlet plenum 134 is coupled to second inlet 120 and outlet plenum 136 is coupled to second outlet 128. Inlet plenum 134 and outlet plenum 136 are adjacent inlet header 122 and outlet header 124 to facilitate first fluid 112 and second fluid 116 exchanging heat as first fluid 112 and second fluid 116 flow into and out of core 102. Moreover, a plurality of conduits 125 are coupled to inlet header 122 and outlet header 124 and extend through inlet plenum 134 and outlet plenum 136. In alternative embodiments, heat exchanger 100 includes any inlet plenums 134 and outlet plenums 136 that enable heat exchanger 100 to operate as described herein.

Also, in the exemplary embodiment, core 102 is manufactured using an additive manufacturing process. An additive manufacturing process allows core 102 to have complex geometries while limiting the number of joints of core 102.

In alternative embodiments, core 102 is formed in any manner that enables heat exchanger 100 to operate as described herein.

During operation of heat exchanger 100, first fluid 112 flows into inlet header 122 through first inlet 118 and is distributed into first passageway 110 through ports 130. First fluid 112 in first passageway 110 is directed through core 102, redirection portion 103, and manifold portion 104. After flowing through first passageway 110, first fluid 112 flows through ports 130 into outlet header 124 and is discharged from heat exchanger 100 through first outlet 126. Second fluid 116 flows into inlet plenum 134 through second inlet 120 and is distributed into second passageway 114. Second fluid 116 in first passageway 114 is directed through core 102, redirection portion 103, and manifold portion 104. After flowing through second passageway 114, second fluid 116 flows into outlet plenum 136 where second fluid 116 is discharged from heat exchanger 100 through second outlet 128.

In alternative embodiments, heat exchanger 100 includes any passageways that enable heat exchanger 100 to operate as described herein. For example, in some embodiments, heat exchanger 100 includes at least one bypass passageway (not shown) to enable first fluid 112 and/or second fluid 116 to bypass at least a portion of first passageway 110 and/or second passageway 114. The bypass passageway (not shown) extends through any portions of heat exchanger 100, e.g., through core 102, redirection portion 103, manifold portion 104, and/or along an external periphery of heat exchanger 100. As a result, the bypass passageway (not shown) facilitates management of pressure drop due to excess amounts of first fluid 112 and/or second fluid 116.

Moreover, in the exemplary embodiment, core 102 is configured such that first fluid 112 and second fluid 116 exchange heat as first fluid 112 and second fluid 116 flow through core 102, redirection portion 103, and manifold portion 104. For example, as shown in FIG. 2, first fluid 112 and second fluid 116 exchange heat through sidewalls of unit cells 108 as first fluid 112 and second fluid 116 flow through portions of first passageway 110 and second passageway 114 defined by unit cells 108. As will be described in more detail below, unit cells 108 define portions of first passageway 110 and second passageway 114 where first fluid 112 and second fluid 116 combine and divide to disrupt thermal boundary layers in first fluid 112 and second fluid 116. In the exemplary embodiment, unit cells 108 are aligned and coupled together such that core 102 is substantially symmetrical, which facilitates multiple flow configurations of heat exchanger 100. For example, in the illustrated embodiment, core 102 has a diamond shape. In alternative embodiments, core 102 has any configuration that enables heat exchanger 100 to operate as described herein.

In some embodiments, core 102 is divided up into independent zones. Unit cells 108 facilitate sectioning and/or segmenting core 102 into the independent zones. In further embodiments, heat exchanger 100 includes a plurality of discrete cores 102. The repeating geometric shapes of unit cells 108 facilitate core 102 coupling to other cores 102 in multiple different configurations. In some embodiments, heat exchanger 100 includes a segment (not shown) linking separate cores 102 such that a portion of fluid flows through the segment between cores 102.

Figure 3:
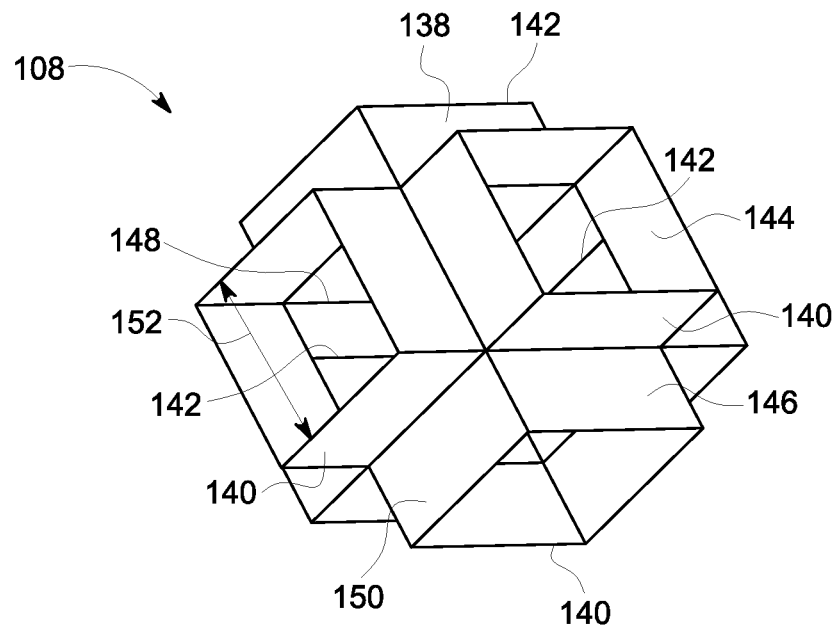
FIG. 3 is a schematic isometric view of a unit cell of the heat exchanger shown in FIG. 1.
Figure 4:
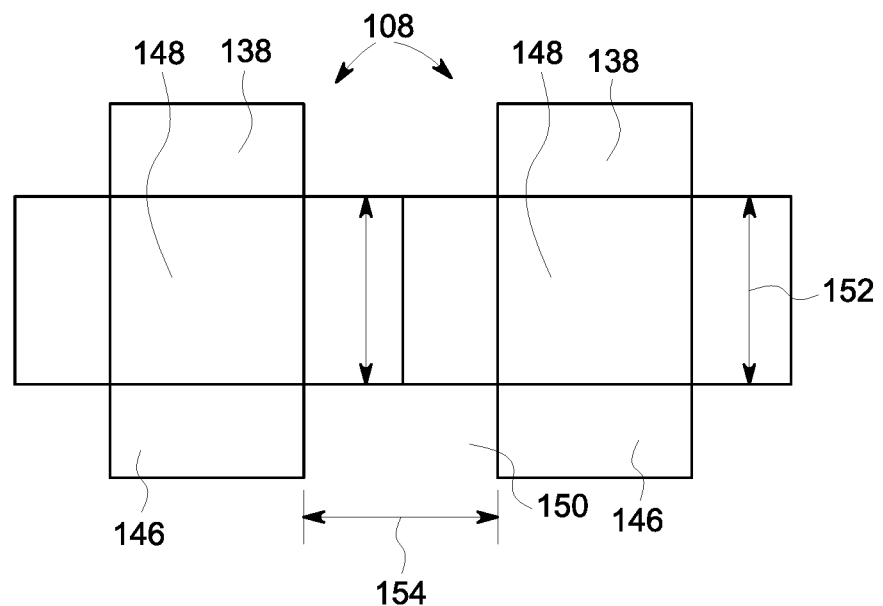
FIG. 4 is a schematic side view of a plurality of the unit cells shown in FIG. 3.

FIG. 3 is a schematic isometric view of unit cell 108. FIG. 4 is a schematic side view of a plurality of unit cells 108. In some embodiments, core 102 includes some unit cells 108 that differ in some aspects from unit cells 108 shown in FIGS. 3 and 4. In the exemplary embodiment, each unit cell 108 includes a sidewall 138 defining a plurality of unit cell inlets 140, a plurality of unit cell outlets 142, an interior surface 144, and an exterior surface 146. First fluid 112 flows into unit cell 108 through unit cell inlets 140, contacts interior surface 144, and flows out of unit cell 108 through unit cell outlets 142. Second fluid 116 flows past unit cell 108 such that second fluid 116 contacts exterior surface 146. In the illustrated embodiment, each unit cell 108 has three unit cell inlets 140 and three unit cell outlets 142. In alternative embodiments, unit cell 108 has any unit cell inlets 140 and unit cell outlets 142 that enable heat exchanger 100 to operate as described herein.

Also, in the exemplary embodiment, each unit cell 108 forms a first passageway portion 148 of first passageway 110 and a second passageway portion 150 of second passageway 114. First passageway portion 148 and second passageway portion 150 are configured for first fluid 112 and second fluid 116 to exchange thermal energy through sidewall 138. In operation, first fluid 112 flows into first passageway portion 148 from other first passageway portions 148 associated with other unit cells 108. First passageway portion 148 furcates such that first fluid 112 flows out of first passageway portion 148 towards further first passageway portions 148. In particular, first passageway portion 148 trifurcates such that first fluid 112 flows into three flow paths towards three different first passageway portions 148. Second fluid 116 flows into second passageway portion 150 from other second passageway portions 150. Second passageway portion 150 furcates such that second fluid 116 flows out of second passageway portion 150 towards further second passageway portions 150. In particular first passageway portion 148 trifurcates such that second fluid 116 flows into three flow paths towards three different second passageway portions 150. First passageway portion 148 and second passageway portion 150 furcate at an approximately 90 degree angle. In alternative embodiments, first passageway portion 148 and second passageway portion 150 furcate at any angles that enable heat exchanger 100 to operate as described herein.

The furcated shapes of first passageway portion 148 and second passageway portion 150 provide for additional surface area to facilitate heat exchange between first fluid 112 and second fluid 116. Moreover, the furcation of unit cells 108 reduces and/or inhibits the formation of thermal boundary layers in first fluid 112 and second fluid 116. For example, thermal and momentum boundary layers are broken up each time first fluid 112 and second fluid 116 are redirected due to unit cells 108 furcating. Moreover, the repeated furcation in unit cells 108 inhibit first fluid 112 and second fluid 116 from establishing significant thermal and momentum boundary layers. In alternative embodiments, first passageway portion 148 and second passageway portion 150 have any configuration that enables heat exchanger 100 to operate as described herein.

In addition, in the exemplary embodiment, first passageway portion 148 has a first hydraulic diameter 152 and second passageway portion 150 has a second hydraulic diameter 154. First hydraulic diameter 152 and second hydraulic diameter 154 are determined based on flow requirements, such as flow rate, pressure drop, and heat transfer, and/or volume requirements for heat exchanger 100. Unit cell 108 forms first passageway portion 148 such that first hydraulic diameter 152 is approximately equal to the width of unit cell inlet 140. Second passageway portion 150 is formed by multiple unit cells 108. Accordingly, unit cell 108 spans only a portion of second hydraulic diameter 154. In the illustrated embodiment, unit cell 108 spans approximately half of second hydraulic diameter 154. Moreover, in the exemplary embodiment, first hydraulic diameter 152 is approximately equal to second hydraulic diameter 154. In alternative embodiments, first passageway portion 148 and second passageway portion 150 have any hydraulic diameters that enable heat exchanger 100 to operate as described herein. For example, in some embodiments, first hydraulic diameter 152 and second hydraulic diameter 154 are different from each other. In further embodiments, first hydraulic diameter 152 is greater than second hydraulic diameter 154 such that a ratio of first hydraulic diameter 152 to second hydraulic diameter 154 is at least 2:1.

Moreover, in the exemplary embodiment, first passageway portion 148 and second passageway portion 150 have a square cross-sectional shape. In alternative embodiments, first passageway portion 148 and second passageway portion 150 have any cross-sectional shape that enables heat exchanger 100 to operate as described herein. For example, in some embodiments, first passageway portion 148 and/or second passageway portion 150 have any of the following cross-sectional shapes, without limitation: rectangular, diamond, circular, and triangular. Moreover, in some embodiments, first passageway portion 148 and/or second passageway portion 150 include any of the following, without limitation: a fin, a surface having engineered roughness, a surface roughened by manufacturing process, any other heat transfer enhancement, and combinations thereof.

In the exemplary embodiment, the shape and size of unit cells 108 is determined based at least in part on any of the following, without limitation: surface area, pressure drop, compactness of core 102, and fluid flow. In the exemplary embodiment, unit cells 108 have substantially the same shape. In particular, unit cells 108 have a partially cuboid shape. In alternative embodiments, core 102 includes any unit cells 108 that enable heat exchanger 100 to operate as described herein. In some embodiments, core 102 includes unit cells 108 that differ in configuration from each other. In further embodiments, the shape of unit cells 108 at least partially conforms to a shape of core 102. For example, in some embodiments, unit cells 108 are at least partially curved to align with an annular shape of core 102.

In some embodiments, at least a portion of unit cells 108 are flexible to facilitate unit cells 108 shifting in response to characteristics of first fluid 112 and/or second fluid 116 such as pressure, flow rate, volume, and density. For example, in some embodiments, sidewalls 138 are flexible and adjust to attenuate fluid surge. In further embodiments, unit cells 108 are flexible such that first fluid 112 causes first passageway 110 to expand and at least partially propel second fluid 116 through second passageway 114. In the exemplary embodiment, sidewalls 138 of unit cells 108 are substantially rigid. In alternative embodiments, unit cells 108 have any amount of flexibility that enables heat exchanger 100 to operate as described herein.

FIG. 5 is a schematic side view of a unit cell 156 for use in the heat exchanger 100. FIG. 6 is a schematic view of fluid flow through a plurality of unit cells 156. Unit cell 156 includes a sidewall 158 at least partially defining first passageway portion 148 and second passageway portion 150. First passageway portion 148 has first hydraulic diameter 152 and second passageway portion 150 has second hydraulic diameter 154. Unit cells 156 are configured such that first hydraulic diameter 152 is different than second hydraulic diameter 154. In addition, sidewall 158 is at least partially curved such that first passageway portion 148 and second passageway portion 150 form blended flow passageways. In particular, the edges of sidewall 158 are blended to facilitate smooth fluid flow. The hydrodynamic shape of first passageway portion 148 and second passageway portion 150 reduces pressure drop due to changes in direction of first fluid 112 and second fluid 116. In alternative embodiments, core 102 includes any unit cells 156 that enable heat exchanger 100 to operate as described herein. In some embodiments, unit cell 156 incorporates minimal surfaces to facilitate blending of unit cell 156. For example, in some embodiments, unit cell 156 maintains a constant mass and reduced stress to increase structural and pressure capabilities. In further embodiments, structural and pressure capability remain constant and the mass is reduced.

With particular reference to FIG. 6, an example flow of first fluid 112 and second fluid 116 through a plurality of unit cells 108 is described. FIG. 6 includes an X-axis, a Y-axis, and a Z-axis for reference throughout the following description. Arrows 160 indicate the flow direction of first fluid 112 and arrows 162 indicate the flow direction of second fluid 116. Arrows 160 and arrows 162 extend in the X-direction, the Y-direction, and the Z-direction. Notably, arrows 160 extending in the Z-direction point into the drawing sheet away from the viewer and arrows 162 extending in the Z-direction point out of the drawing sheet towards the viewer.

Unit cells 108 are coupled in flow communication such that each first passageway portion 148 receives first fluid 112 from three other first passageway portions 148 and each second passageway portion 150 receives second fluid 116 from three other second passageway portions 150. In addition, each first passageway portion 148 directs first fluid 112 towards three different first passageway portions 148 and each second passageway portion 150 directs second fluid 116 toward three different second passageway portions 150. Accordingly, first fluid 112 and second fluid 116 flow in at least partially counter-flow directions. In alternate embodiments, first fluid 112 and second fluid 116 flow in any directions that enable heat exchanger 100 to operate as described herein. For example, in some embodiments, heat exchanger 100 is configured such that first fluid 112 and second fluid 116 flow in counter-flow directions, parallel-flow directions, cross-flow directions, and hybrids thereof.

FIG. 7 is a schematic view of flow passages 166 adjacent casing 106 of heat exchanger 100 (shown in FIG. 1). Flow passages 166 are formed by peripheral unit cells 168 such that fluid 170 flows through flow passages 166. Fluid 170 is one of first fluid 112 (shown in FIG. 1) and second fluid 116 (shown in FIG. 1). In alternative embodiments, fluid 170 is any fluid that enables heat exchanger 100 to operate as described herein. In the exemplary embodiment, flow passages 166 are configured to direct fluid 170 away from casing 106 to inhibit fluid 170 becoming trapped in a stagnant zone 172. Some flow passages 166 include a barrier 174 that inhibits fluid 170 entering stagnant zone 172. Some flow passages 166 include a channel 176 for fluid 170 to flow out of stagnant zone 172. In alternative embodiments, flow passages 166 are configured in any manner that enables heat exchanger 100 to operate as described herein. For example, in some embodiments, unit cells 168 are configured such that fluid 170 flows through a geometric flow transition, such as the 180 degree turn in redirection portion 103 (shown in FIG. 1), while maintaining heat exchange throughout at least a portion of the geometric flow transition.

In some embodiments, components of heat exchanger 100, such as core 102, are used in applications not necessarily requiring heat exchange. For example, in some embodiments, components of heat exchanger 100 are used in reactor applications, mass transfer applications, phase-change applications, and solid oxide fuel cells (SOFC). In some embodiments of SOFC systems, unit cells 108 are positioned between anode-electrolyte-cathode layers. In some embodiments of phase-change systems, unit cells 108 include sidewalls 138 having small pores (not shown) and/or engineered surfaces (not shown) to allow fluids to boil and/or condense. In alternative embodiments, heat exchanger 100 is used for any applications and/or systems that require movement of fluid.

FIG. 8 is a schematic view of flow configurations of heat exchanger 100. Heat exchanger 100 is configured such that first fluid 112 and second fluid 116 flow through core 102 in multiple directions. In particular, manifold portion 104 is configured and/or coupled to core 102 in different locations such that first fluid 112 and second fluid 116 are directed through core 102 in different directions. Core 102 does not have to change shape, size, and/or arrangement of unit cells 108 to accommodate different locations and configurations of manifold portions 104. Moreover, the different configurations of core 102 and manifold portion 104 enable heat exchanger 100 to meet specific system requirements, such as shape, space, and piping requirements. For example, in some embodiments, manifold portions 104 are coupled to specific locations on core 102 that enable heat exchanger 100 to fit different spaces, shapes, and/or piping connections. In further embodiments, unit cells 108 are coupled together to form core 102 having a desired shape and flow configuration. In alternative embodiments, core 102 and manifold portion 104 have any configuration that enables heat exchanger 100 to operate as described herein.

In one embodiment, heat exchanger 100 is configured such that first fluid 112 and second fluid 116 flow through core 102 in a counter-flow configuration 200. In counter-flow configuration 200, a first manifold portion 202 and a second manifold portion 204 are coupled to opposed ends of core 102. First manifold portion 202 includes a first fluid inlet 206 and a second fluid outlet 208. Second manifold portion 204 includes a first fluid outlet 210 and a second fluid inlet 212. First fluid 112 is directed through core 102 from first fluid inlet 206 toward first fluid outlet 210 and second fluid 116 is directed through core 102 from second fluid inlet 212 toward second fluid outlet 208. As a result, first fluid 112 and second fluid 116 flow through core 102 in substantially opposed directions.

In another embodiment, heat exchanger 100 is configured such that first fluid 112 and second fluid 116 flow through core 102 in a parallel-flow configuration 214. In parallel-flow configuration 214, a first manifold portion 216 and a second manifold portion 218 are coupled to opposed ends of core 102. First manifold portion 216 includes a first fluid inlet 220 and a second fluid inlet 222. Second manifold portion 218 includes a first fluid outlet 224 and a second fluid outlet 226. First fluid 112 is directed through core 102 from first fluid inlet 220 toward first fluid outlet 224 and second fluid 116 is directed through core 102 from second fluid inlet 222 toward second fluid outlet 226. As a result, first fluid 112 and second fluid 116 flow through core 102 in substantially parallel directions.

In another embodiment, heat exchanger 100 is configured such that first fluid 112 and second fluid 116 flow through core 102 in a cross-flow configuration 228. In cross-flow configuration 228, first manifold portion 230 and second manifold portion 232 are coupled to opposed ends of core 102. Third manifold portion 234 and fourth manifold portion 236 are coupled to sides of core 102. First manifold portion 230 includes a first fluid inlet 238 and second manifold portion 232 includes a first fluid outlet 240. Third manifold portion 234 includes a second fluid inlet 242 and fourth manifold portion 236 includes a second fluid outlet 244. First fluid 112 is directed through core 102 from first fluid inlet 238 towards first fluid outlet 240. Second fluid 116 is directed through core 102 from second fluid inlet 242 towards second fluid outlet 244. As a result, first fluid 112 and second fluid 116 flow through core 102 in substantially transverse directions. In particular, the flow of first fluid 112 is substantially perpendicular to the flow of second fluid 116.

FIG. 9 is a schematic view of a hybrid counter-flow configuration 300 of heat exchanger 100. In hybrid counter-flow configuration 300, a first manifold portion 302 is coupled to a side of core 102. A second manifold portion 304 and a third manifold portion 306 are coupled to opposed ends of core 102. First manifold portion 302 includes a first fluid inlet 308 and a first header 310. Second manifold portion 304 includes a second fluid inlet 312, a first fluid outlet 314, a second header 316, and a third header 318. Third manifold portion 306 includes a fourth header 320 and a second fluid outlet 322. First fluid 112 is directed through core 102 from first fluid inlet 308 and first header 310 towards third header 318 and first fluid outlet 314. First fluid 112 is at least partially redirected as first fluid 112 flows through core 102. Second fluid 116 is directed through core 102 from second fluid inlet 312 and second header 316 towards fourth header 320 and second fluid outlet 322. As a result, the flow configurations of first fluid 112 and second fluid 116 vary through regions of core 102. In particular, first fluid 112 and second fluid 116 flow through a cross-flow region 324, a hybrid flow region 326, and a counter-flow region 328. In cross-flow region 324, first fluid 112 and second fluid 116 flow in substantially transverse directions. In hybrid flow region 326, the directions of flow of first fluid 112 and second fluid 116 change in relation to each other such that the flows are partially transverse and partially opposed. In hybrid flow region 326, a portion of the flows of first fluid 112 and second fluid 116 are diagonal to each other. In counter-flow region 328, first fluid 112 and second fluid 116 flow in substantially opposed directions.

FIG. 10 is a schematic view of a hybrid parallel flow configuration 400 of heat exchanger 100. In hybrid parallel flow configuration 400, a first manifold portion 402 is coupled to a side of core 102. A second manifold portion 404 and a third manifold portion 406 are coupled to opposed ends of core 102. First manifold portion 402 includes a first fluid inlet 408 and a first header 410. Second manifold portion 404 includes a second fluid outlet 412, a first fluid outlet 414, a second header 416, and a third header 418. Third manifold portion 406 includes a fourth header 420 and a second fluid inlet 422. First fluid 112 is directed through core 102 from first fluid inlet 408 and first header 410 towards second header 416 and first fluid outlet 414. First fluid 112 is at least partially redirected as first fluid 112 flows through core 102. Second fluid 116 is directed through core 102 from second fluid inlet 422 and fourth header 420 towards third header 418 and second fluid outlet 412. As a result, the flow configurations of first fluid 112 and second fluid 116 vary through regions of core 102. In particular, first fluid 112 and second fluid 116 flow through a cross-flow region 424, a hybrid flow region 426, and a parallel flow region 428. In cross-flow region 424, first fluid 112 and second fluid 116 flow in substantially transverse directions. In hybrid flow region 426, the directions of flow of first fluid 112 and second fluid 116 change in relation to each other such that the flows are partially transverse and partially parallel. In hybrid flow region 426, a portion of the flows of first fluid 112 and second fluid 116 are diagonal to each other. In parallel flow region 428, first fluid 112 and second fluid 116 flow in substantially parallel directions.

In alternative embodiments, first fluid 112 and second fluid 116 flow through core 102 in any directions that enable heat exchanger 100 to operate as described herein. For example, in some embodiments, at least one of first fluid 112 and second fluid 116 is redirected as first fluid 112 and/or second fluid 116 flows through core 102. In further embodiments, first fluid 112 and second fluid 116 flow through core 102 in any of the following flow configurations, without limitation: counter-flow, parallel flow, cross-flow, and combinations thereof. Moreover, in some embodiments, first fluid 112 and second fluid 116 flow through core 102 in any of the following directions relative to each other, without limitation: diagonal, curved, perpendicular, parallel, transverse, and combinations thereof.

Referring to FIGS. 1 and 2, a baffle 105 is used to guide the flows from the fluid supplies, e.g. the first fluid 112 and the second fluid 116, through the manifold portion 104, through the heat exchanger core 102, through the redirection portion 103, and out the fluid discharge areas 126, 128. The baffle 105 is used to baffle both fluid domains at the same location within the core 102 by interacting with both fluid domains within the same geometric plane. As discussed above, such an arrangement allows for a counter flow configuration, a parallel flow configuration, or a cross flow configuration. In such configurations, the flows of the first and second fluids are dependent on each other.

Referring to FIGS. 11-14, in an alternative embodiment a heat exchanger core 500 is formed by unit cells 108 in any manner similar to that described above. The heat exchanger core 500 may be provided in a casing, for example a casing 106 as described above, having a structure similar to that shown in FIGS. 1 and 2. The heat exchanger may also include manifold portions similar to those described above coupled to the heat exchanger core 500. The manifold portions may each include a plurality of first inlets, second inlets, inlet headers, outlet headers, first outlets, and/or second outlets. The heat exchanger core 500 may also include an inlet plenum and an outlet plenum similar to the heat exchanger core discussed above with respect to FIGS. 1 and 2.

The heat exchanger core 500 includes internal baffles 502, 504, 506, 508 that guide the flow through the heat exchanger core 500. The baffles may be provided in the first passageways and/or the second passageways to independently guide each of the first fluid flow and the second fluid flow. As used herein the terms "independent" and "independently" mean that the design of the first fluid flow is not dependent on the parameters of the second fluid flow. Each of the first fluid flow and the second fluid flow may have an independent flow configuration and velocities to match up the heat transfer and pressure drop requirements. The flow requirements for each of the first fluid and the second fluid are determined by the flow rate, the pressure drop, the heat transfer, volume requirements, and/or internal baffle placement.

As shown in FIGS. 11-14, the baffles 502, 504, 506, 508 may be solid walls built into the heat exchanger, for example the heat exchanger core 500, that block the flow passages encompassed by the individual unit cells 108. The baffles may independently block the flow passages of a particular fluid domain, e.g. the first fluid domain and/or the second fluid domain, to route the fluid flow through the core 500 without affecting the flow passages of any of the other fluid domains. Unlike the baffle 105 shown in FIGS. 1 and 2, each baffle 502, 504, 506, 508 as shown in FIG. 14 blocks a flow passage of a particular fluid domain at its location without blocking the flow passage of any other fluid domain at the same location. As shown in FIG. 14, the baffles 502, 504, 506, 508 allow the first fluid 112 to pass freely while blocking passage of the second fluid 116. Although it appears from the figure that the first fluid 112 and the second fluid 116 cross or mix, it should be appreciated that the domains of the first fluid 112 and the second fluid 116 are separate and no mixing of the first fluid 112 and the second fluid 116 occurs.

The baffles may extend into each fluid's manifold region to provide improved flow distribution and reduced pressure drop. If the inlet and outlet locations for each fluid are in the same location independent baffles can be used to provide partially or fully counterflow of the fluids, thus increasing the heat exchanger performance. This allows the positions of the supply and discharge to be less limiting. A particular heat exchanger design may be limited by the required location of the supply and discharge ports, the available volume, the flowrates pressure drops, and required heat transfer. The use of the internal baffles to independently route each fluid flow provides greater design freedom and results in smaller, lighter, and better performing heat exchangers.

The systems and methods described herein include a core that enables heat exchangers to have different shapes, sizes, and flow configurations. The core includes a plurality of unit cells. The unit cells define passageways for at least two different heat exchange fluids such that the fluids combine and divide in close proximity separated only by a sidewall of the unit cell. In some embodiments, each unit cell is configured to receive flows of heat exchange fluid from at least three other unit cells such that the flows combine into a single flow. In addition, each unit cell forms a trifurcated passageway portion such that the flow divides and is discharged into at least three other unit cells. As a result, the thermal boundary layers of the heat exchange fluids are reduced and the heat exchange fluids more efficiently transfer heat through the sidewalls of the unit cells in comparison to heat exchange fluids in known heat exchangers. Moreover, the heat exchangers described herein include multiple arrangements and flow configurations to meet overall system requirements and have increased efficiency.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A heat exchanger, comprising:
   a core comprising a plurality of unit cells coupled together, each unit cell having an interior volume and an exterior surface, wherein, collectively, the interior volume of the plurality of unit cells define a first passageway for a flow of a first fluid, and the exterior surface of the plurality of unit cells define a second passageway for a flow of a second fluid, with the first passageway and second passageway being fluidly separated; and
   at least one baffle comprising a solid wall physically separate from the unit cells, the at least one baffle being disposed in one of the first passageway or the second passageway, the at least one baffle extending continuously between the interior volume of or along the exterior surface of two or more unit cells of the plurality of unit cells, the at least one baffle being configured to route the flow of the first fluid independently from the flow of the second fluid.

2. The heat exchanger of claim 1, further comprising a casing surrounding the core and defining at least a portion of the first passageway or the second passageway, and the at least one baffle extends from the casing.

3. The heat exchanger of claim 2, wherein the at least one baffle intersects and extends through two or more unit cells.

4. The heat exchanger of claim 2, wherein the at least one baffle completely spans the core and extends from one side of the casing to another side of the casing.

5. The heat exchanger of claim 4, wherein the at least one baffle comprises a first baffle that spans the core and a second baffle that partially spans the core.

6. The heat exchanger of claim 1, wherein the solid wall defines a plane and blocks the first passageway at the plane without blocking the second passageway at the plane.

7. The heat exchanger of claim 6, wherein the solid wall has an opening aligned with the second passageway.

8. The heat exchanger of claim 1, wherein the solid wall is disposed between adjacent ones of the plurality of unit cells.

9. The heat exchanger of claim 1, wherein the at least one baffle extends across the interior volume of more than two unit cells of the plurality of unit cells.

10. The heat exchanger of claim 9, wherein the at least one baffle has at least one dimension that is greater than a largest dimension of at least one of the more than two unit cells.

11. A heat exchanger, comprising:
a core comprising a plurality of unit cells coupled together, each unit cell having an interior volume and an exterior surface, wherein, collectively, the interiors from the plurality of unit cells define a first passageway for a flow of a first fluid, and the exteriors of the unit cells define a second passageway for a flow of a second fluid, with the first passageway and second passageway being fluidly separated; and
at least one baffle separate from the unit cells, the at least one baffle extending continuously between and being located within the interior volume of more than one unit cell, the at least one baffle independently blocking the first passageway without blocking the second passageway at the same location.

12. The heat exchanger of claim 11, wherein the at least one baffle is a wall with an opening at the second passageway.

13. The heat exchanger of claim 12, wherein the wall has no openings at the first passageway.

14. The heat exchanger of claim 13, wherein the wall passes through both the first passageway and the second passageway.

15. The heat exchanger of claim 14, wherein the wall is disposed between adjacent ones of the plurality of unit cells.

16. The heat exchanger of claim 15, further comprising a casing surrounding at least a portion of the core.

17. The heat exchanger of claim 16, wherein the wall extends from the casing.

18. A heat exchanger, comprising:
a core defining a first passageway for a first fluid to flow through the core and a second passageway for a second fluid to flow through the core, the first and second passageways being fluidly isolated, the core including unit cells coupled together in a three-dimensional array, each of the unit cells having an interior volume and an exterior surface, wherein the interior volume of each of the unit cells is fluidly connected to the interior volume of an adjacent one of the unit cells and forms a portion of the first passageway, and wherein a space between the exterior surfaces of two adjacent ones of the units cells forms a portion of the second passageway; and
a baffle separate from the unit cells and located along a plane within the interior volume of more than one unit cell, and blocking at least a portion of the first passageway formed by the interior volume of each unit cell of a set of the unit cells that are intersected by the baffle along the plane without blocking the second passageway formed between adjacent ones of the set of unit cells that are intersected by the plane.

19. The heat exchanger of claim 18 wherein the baffle is a first baffle, the plane is a first plane, and the set of the unit cells is a first set of the unit cells, the heat exchanger further including a second baffle extending into the core along a second plane and blocking at least a portion of the second passageway formed between adjacent ones of a second set of the unit cells that are intersected by the second baffle along the second plane without blocking the first passageway formed by the interior volume of each unit cells of the second set of units cells that are intersected by the second plane.

20. The heat exchanger of claim 19, wherein the first and second baffles are parallel to and spaced apart from each other.

* * * * *